US011904677B2

United States Patent
Kim et al.

(10) Patent No.: US 11,904,677 B2
(45) Date of Patent: Feb. 20, 2024

(54) COOLING MODULE PLACED ON SIDE OF VEHICLE

(71) Applicant: Hanon Systems, Daejeon (KR)

(72) Inventors: Young Chan Kim, Daejeon (KR); Jung Sam Gu, Daejeon (KR); Hyuk Kim, Daejeon (KR)

(73) Assignee: Hanon Systems, Daejeon (KR)

( * ) Notice: Subject to any disclaimer, the term of this patent is extended or adjusted under 35 U.S.C. 154(b) by 108 days.

(21) Appl. No.: 17/533,830

(22) Filed: Nov. 23, 2021

(65) Prior Publication Data

US 2022/0169109 A1 Jun. 2, 2022

(30) Foreign Application Priority Data

Nov. 27, 2020 (KR) .................. 10-2020-0162232
Nov. 27, 2020 (KR) .................. 10-2020-0162303

(51) Int. Cl.
| | |
|---|---|
| *B60K 11/04* | (2006.01) |
| *F28D 21/00* | (2006.01) |
| *F28D 1/04* | (2006.01) |
| *F28D 1/02* | (2006.01) |
| *B60L 58/26* | (2019.01) |

(52) U.S. Cl.
CPC ............ *B60K 11/04* (2013.01); *B60L 58/26* (2019.02); *F28D 1/024* (2013.01); *F28D 1/0426* (2013.01); *F28D 1/0435* (2013.01); *F28D 1/0443* (2013.01); *F28D 2021/0092* (2013.01)

(58) Field of Classification Search
CPC ..... B60K 11/04; F28D 1/0452; F28D 1/0426; F28D 1/0435
See application file for complete search history.

(56) References Cited

U.S. PATENT DOCUMENTS

| | | | | |
|---|---|---|---|---|
| 4,651,816 | A * | 3/1987 | Struss | F28D 1/0452 165/76 |
| 5,269,367 | A * | 12/1993 | Susa | F28F 9/002 165/41 |
| 6,205,802 | B1 * | 3/2001 | Drucker | B60H 1/00371 62/236 |
| 6,408,939 | B1 * | 6/2002 | Sugimoto | F28F 1/128 165/149 |
| 9,694,668 | B1 * | 7/2017 | Yun | B60K 11/06 |
| 10,801,372 | B2 * | 10/2020 | Rousseau | F28D 1/05366 |
| 2004/0104007 | A1 * | 6/2004 | Kolb | F02B 29/0456 165/41 |

(Continued)

FOREIGN PATENT DOCUMENTS

| | | | | |
|---|---|---|---|---|
| JP | 3945062 B2 | * | 7/2007 | |
| KR | 2010003184 U | * | 3/2010 | ........... F28D 1/0452 |

(Continued)

OTHER PUBLICATIONS

Translation of Japanese Patent Document JP3945062B2 entitled Translation—JP3945062B2 (Year: 2023).*

*Primary Examiner* — Paul Alvare

(74) *Attorney, Agent, or Firm* — Norton Rose Fulbright US LLP; James R. Crawford

(57) ABSTRACT

Provided is a cooling module for a vehicle, and more particularly, a cooling module placed on a side of the vehicle with three-row mounting parts, in which components are mounted, to maximize cooling efficiency and space utilization inside the vehicle.

15 Claims, 22 Drawing Sheets

(56) References Cited

U.S. PATENT DOCUMENTS

| | | | |
|---|---|---|---|
| 2005/0274507 A1* | 12/2005 | Sanada | F25B 39/04 |
| | | | 62/239 |
| 2006/0042308 A1* | 3/2006 | Nishida | F28D 7/0033 |
| | | | 62/503 |
| 2007/0062671 A1* | 3/2007 | Sugimoto | F28D 1/0452 |
| | | | 165/140 |
| 2015/0101778 A1* | 4/2015 | Kim | F01P 3/18 |
| | | | 165/41 |
| 2016/0245595 A1* | 8/2016 | Jang | F28F 9/262 |
| 2016/0311311 A1* | 10/2016 | Choi | B60K 11/04 |
| 2017/0167795 A1* | 6/2017 | Han | B60K 11/04 |
| 2019/0001807 A1* | 1/2019 | Han | F28F 9/002 |
| 2022/0169109 A1* | 6/2022 | Kim | B60L 1/003 |

FOREIGN PATENT DOCUMENTS

| | | | | |
|---|---|---|---|---|
| KR | 20160041284 A | * | 4/2016 | |
| KR | 20170079203 A | * | 7/2017 | |
| KR | 102008533 B1 | | 8/2019 | |
| KR | 102186959 B1 | * | 12/2020 | |
| KR | 20130102165 A | * | 9/2023 | |
| WO | WO-2011071195 A1 | * | 6/2011 | F01P 5/06 |

\* cited by examiner

COOLING MODULE PLACED ON SIDE OF VEHICLE

CROSS-REFERENCE TO RELATED APPLICATIONS

This application claims priority under 35 U.S.C. § 119 to Korean Patent Application No. 10-2020-0162303, filed on Nov. 27, 2020, and No. 10-2020-0162232, filed on Nov. 27, 2020, in the Korean Intellectual Property Office, the disclosure of which is incorporated herein by reference in its entirety.

TECHNICAL FIELD

The following disclosure relates to a cooling module for a vehicle, and more particularly, to a cooling module placed on a side of the vehicle with three-row mounting parts, in which components are mounted, to maximize cooling efficiency and space utilization inside the vehicle.

BACKGROUND

As eco-friendly vehicles according to the recent trend of automotive technology for reducing carbon dioxide, there are hybrid vehicles and hydrogen fuel cell vehicles. Such hybrid vehicles and hydrogen fuel cell vehicles are applied not only to private cars but also to commercial vehicles, and in particular, buses used to transport passengers.

The hybrid vehicle includes both an engine and a motor to generate power by selectively operating the engine or the motor or by operating both the engine and the motor as needed. Since the hybrid vehicle includes both the engine and the motor, the hybrid vehicle includes cooling devices for cooling heat generated by driving the engine and heat generated from hybrid parts including the motor.

The hydrogen fuel cell vehicle generates power by converting energy from chemical reactions between oxygen and hydrogen into electrical energy. The hydrogen fuel cell vehicle includes a fuel cell stack, a battery, and an electrical component such as a motor, and cooling devices for cooling them respectively.

Here, the hybrid vehicle and the hydrogen fuel cell vehicle have a problem that a cooling unit for the engine or the stack should be mounted separately from a cooling unit for the electrical component, causing many restrictions on spaces for installing the cooling units in the vehicle.

FIG. 1 illustrates main locations at which the cooling units are placed on the commercial vehicle. As illustrated, the separate cooling units are disposed on the front and the ceiling of the commercial vehicle, respectively. However, in particular, the hydrogen fuel cell vehicle requires cooling units for cooling the stack, the battery, and the electronic component, respectively. In this case, the cooling unit for the stack needs to be installed on the front of the vehicle because a large amount of energy is required to cool the stack, and accordingly, the cooling units for the battery and the electronic component should be installed at other locations of the vehicle. However, it is difficult to install all of them on the ceiling because of spatial restrictions. When the cooling units are installed at locations other than the front and the ceiling of the vehicle, for example, on a side of the vehicle as illustrated in FIG. 1, there is a problem that cooling efficiency decreases because of the structural limits of the cooling units.

RELATED ART DOCUMENT

Patent Document (Patent Document 1) Korean Patent No. 2008533 (Aug. 1, 2019)

SUMMARY

An embodiment of the present invention is directed to providing a cooling module placed on a side of a vehicle and capable of maximizing cooling efficiency nevertheless.

In one general aspect, a cooling module includes: a first-row mounting part in which a component is mounted; a second-row mounting part in which another component is mounted, the second-row mounting part being disposed behind the first-row mounting part; and a third-row mounting part in which another component is mounted, the third-row mounting part being disposed behind the second-row mounting part. The cooling module may be placed on a side of a vehicle with respect to a front-rear direction of the vehicle, with the first-row mounting part being located on an outermost side.

At least one of a sub-radiator and a condenser may be mounted in the first-row mounting part, a main radiator may be mounted in the second-row mounting part, a cooling fan may be mounted in the third-row mounting part, and the main radiator may be a cross-flow type radiator including a plurality of tubes arranged to be long in a horizontal direction, and a forward header tank and a rear header tank provided on both sides of the plurality of tubes, respectively, such that coolant flows in the horizontal direction.

The main radiator may have a coolant inlet through which the coolant is introduced into the main radiator, and the coolant inlet may be provided on one side of the rear header tank so that the coolant flows from a rear portion to a front portion of the main radiator with respect to the front-rear direction of the vehicle.

Both the sub-radiator and the condenser may be mounted in the horizontal direction in the first-row mounting part, the sub-radiator may be disposed in a front portion of the first-row mounting part with respect to the front-rear direction of the vehicle, the condenser may be disposed next to the sub-radiator and in a rear portion of the first-row mounting part with respect to the front-rear direction of the vehicle, and the sub-radiator may be a down-flow type radiator including a plurality of tubes arranged to be long in a vertical direction, and an upper header tank and a lower header tank provided on both sides of the plurality of tubes, respectively, such that the coolant flows in the vertical direction.

The upper header tank and the lower header tank of the sub-radiator may be disposed outside a core part area of the main radiator, so that the upper header tank and the lower header tank do not overlap the core part area of the main radiator when the cooling module is viewed from a front side thereof.

The condenser may include a receiver dryer tank formed to be long in the vertical direction, and the receiver dryer tank may be disposed outside a core part area of the main radiator and in the rear portion of the first-row mounting part with respect to the front-rear direction of the vehicle, so that the receiver dryer tank does not overlap the core part area of the main radiator when the cooling module is viewed from a front side thereof.

The cooling fan may be formed by a plurality of unit cooling fans gathered together, and the plurality of unit cooling fans may be arranged alongside in the horizontal direction.

The sub-radiator may be mounted in the first-row mounting part, a core part of the sub-radiator may have a smaller area than a core part of the main radiator, the sub-radiator may be disposed in a rear portion of the first-row mounting part with respect to the front-rear direction of the vehicle, and the sub-radiator may be disposed not to overlap an area in which a foremost one of the plurality of unit cooling fans with respect to the front-rear direction of the vehicle is located when the cooling module is viewed from a front side thereof.

The condenser may be mounted in the first-row mounting part, a core part of the condenser may have a smaller area than a core part of the main radiator, the condenser may be disposed in a rear portion of the first-row mounting part with respect to the front-rear direction of the vehicle, and the condenser may be disposed not to overlap an area in which a foremost one of the plurality of unit cooling fans with respect to the front-rear direction of the vehicle is located when the cooling module is viewed from a front side thereof.

The vehicle may be a hydrogen commercial vehicle, the main radiator may cool coolant for cooling an electrical component of the hydrogen commercial vehicle, and the sub-radiator may cool coolant for cooling a battery of the hydrogen commercial vehicle.

At least one of a sub-radiator and a condenser may be mounted in the first-row mounting part, a main radiator may be mounted in the second-row mounting part, a cooling fan may be mounted in the third-row mounting part, and the main radiator may be a down-flow type radiator including a plurality of tubes arranged to be long in a vertical direction, and an upper header tank and a lower header tank provided on both sides of the plurality of tubes, respectively, such that coolant flows in the vertical direction.

The cooling fan may be formed by a plurality of unit cooling fans gathered together, and the plurality of unit cooling fans may be arranged alongside in the horizontal direction.

The main radiator may have a coolant inlet through which the coolant is introduced into the main radiator, and the coolant inlet may be provided on one side of the upper header tank and disposed in a rear portion of the main radiator with respect to the front-rear direction of the vehicle not to overlap an area in which a foremost one of the plurality of unit cooling fans with respect to the front-rear direction of the vehicle is located when the cooling module is viewed from a front side thereof.

Both the sub-radiator and the condenser may be mounted in the vertical direction in the first-row mounting part, the sub-radiator may be disposed in an upper portion of the first-row mounting part, the condenser may be disposed below the sub-radiator, and the sub-radiator may be a cross-flow type radiator including a plurality of tubes arranged to be long in a horizontal direction, and a forward header tank and a rear header tank provided on both sides of the plurality of tubes, respectively, such that the coolant flows in the horizontal direction.

The sub-radiator may have a coolant inlet through which the coolant is introduced into the sub-radiator, and the coolant inlet may be provided in the rear header tank so that the coolant flows from a rear portion to a front portion of the sub-radiator with respect to the front-rear direction of the vehicle.

The forward header tank and the rear header tank of the sub-radiator may be disposed outside a core part area of the main radiator, so that the forward header tank and the rear header tank do not overlap the core part area of the main radiator when the cooling module is viewed from a front side thereof.

The sub-radiator may further include a pressure cap regulating a pressure inside the sub-radiator, and the pressure cap may be provided on an upper side of at least one of the forward header tank and the rear header tank, and integrally formed with the forward header tank and/or the rear header tank.

The condenser may have a sub-cool area formed in a lower portion of a core part of the condenser.

The tubes of the condenser have a larger thickness than the tubes of the sub-radiator.

The vehicle may be a hydrogen commercial vehicle, the main radiator may cool coolant for cooling an electrical component of the hydrogen commercial vehicle, and the sub-radiator may cool coolant for cooling a battery of the hydrogen commercial vehicle.

Since the cooling module of the present invention is placed on the side of the vehicle, it is possible to increase space utilization inside the vehicle. In addition, even though the cooling module is placed on the side of the vehicle, the cooling efficiency of the cooling module can be maximized through a mutual organic arrangement structure of the components.

DETAILED DESCRIPTION OF MAIN ELEMENTS

10: Cooling module
10-A: Cooling module according to 1-1st exemplary embodiment
10-B: Cooling module according to 1-2nd exemplary embodiment
10-C: Cooling module according to 1-3rd exemplary embodiment
100: First-row mounting part
200: Second-row mounting part
300: Third-row mounting part
Sub RAD: Sub-radiator
COND: Condenser
Main RAD: Main radiator
FAN: Cooling fan
Fan 1, Fan 2, Fan 3: Unit cooling fan 1, 2, 3
core: Core part
H/T: Header tank
R/D: Receiver dryer tank
inlet: Coolant inlet
inlet_S: Coolant inlet of sub-radiator
inlet_M: Coolant inlet of main radiator
outlet_C: Refrigerant outlet of condenser

DETAILED DESCRIPTION OF EMBODIMENTS

Hereinafter, the present invention will be described with reference to the accompanying drawings.

Figure 1:
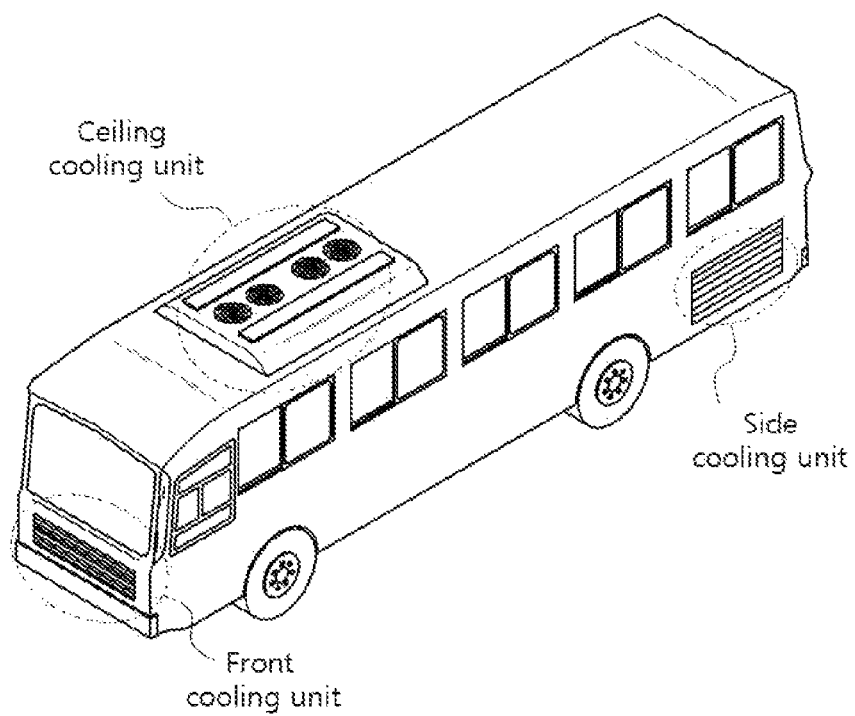
FIG. 1 illustrates main locations at which cooling units are placed on a commercial vehicle.
Figure 2A:
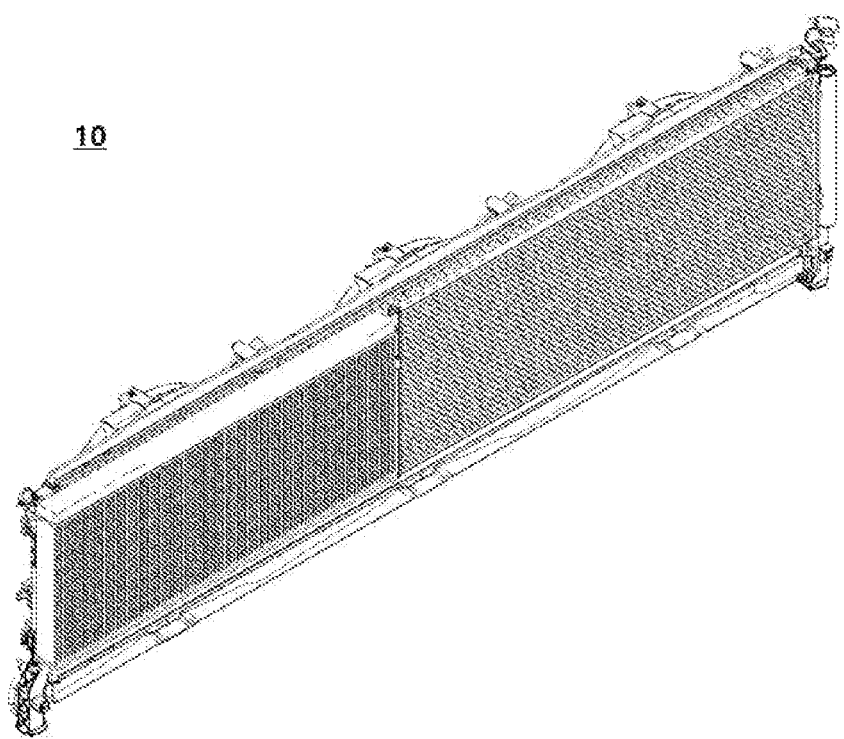
FIG. 2A is a front perspective view of a cooling module according to a first exemplary embodiment of the present invention.
Figure 2B:
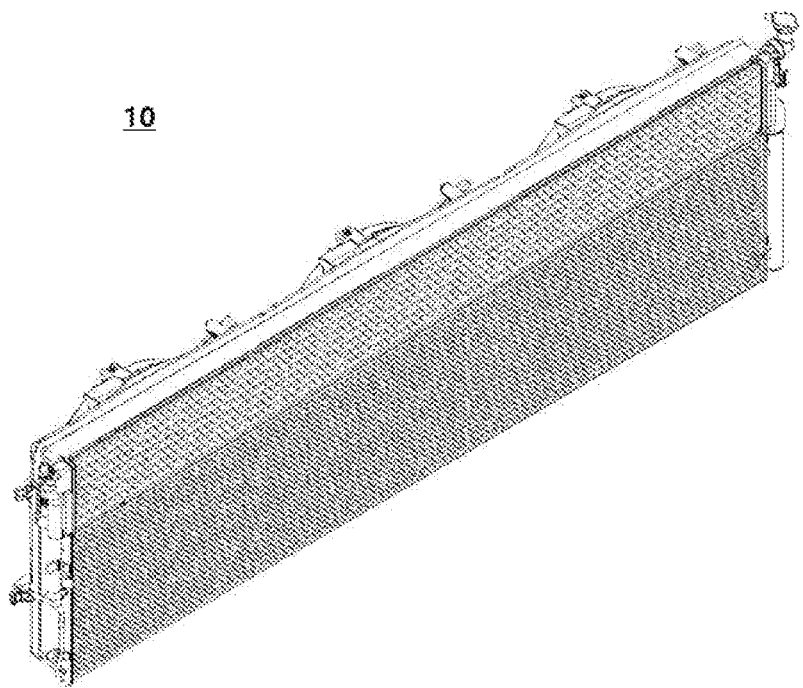
FIG. 2B is a front perspective view of a cooling module according to a second exemplary embodiment of the present invention.
Figure 3A:
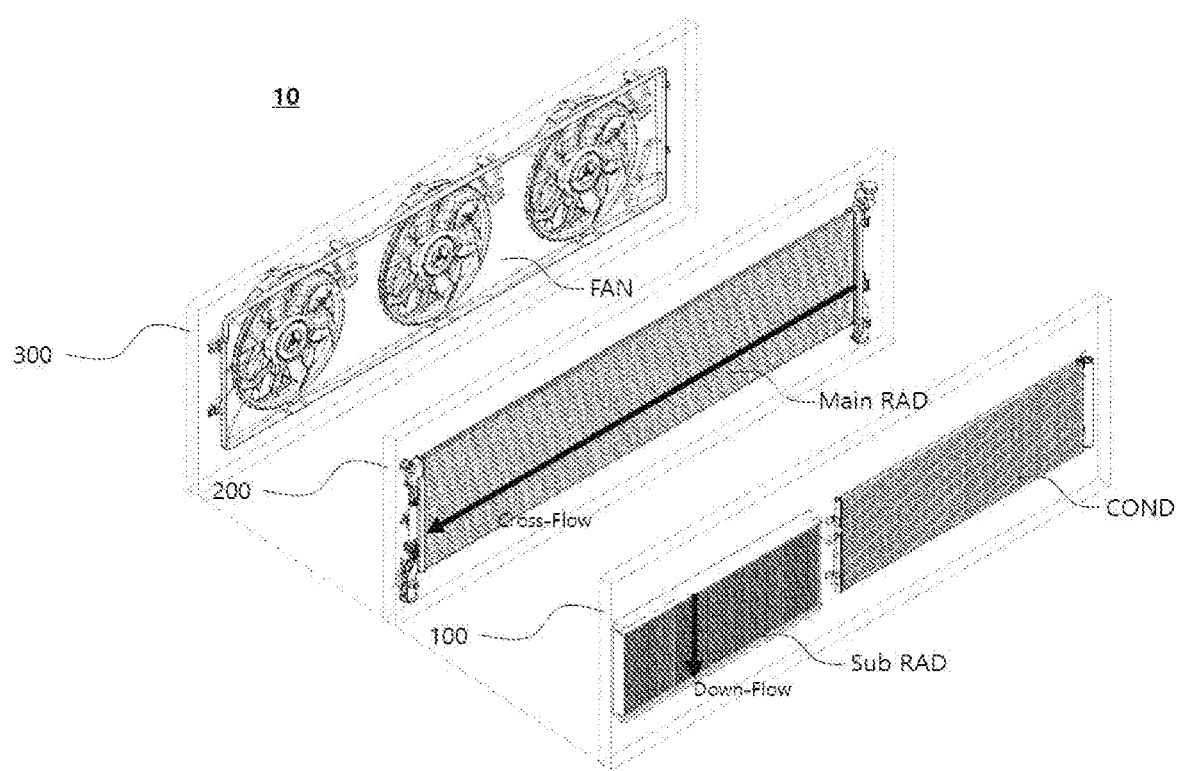
FIG. 3A is a front exploded perspective view of FIG. 2A.
Figure 3B:
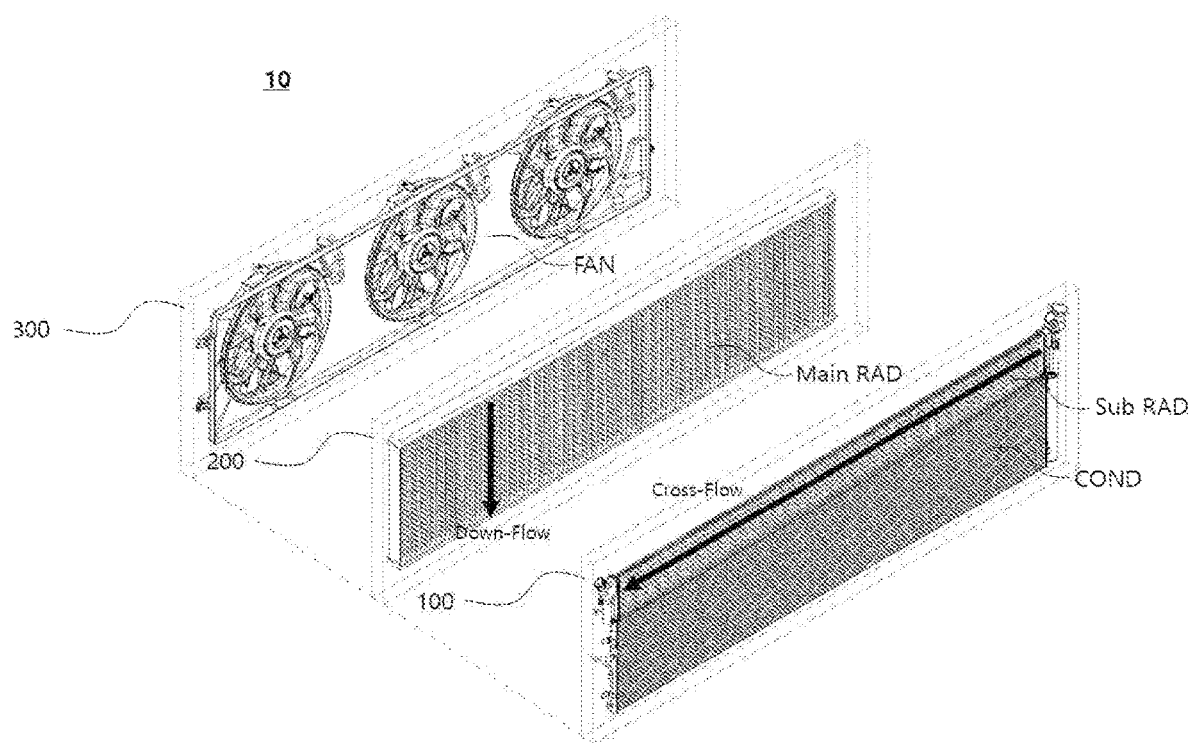
FIG. 3B is a front exploded perspective view of FIG. 2B.

FIGS. 2A and 2B are front perspective views of cooling modules according to first and second exemplary embodiments of the present invention, respectively, and FIGS. 3A and 3B are front exploded perspective views of FIGS. 2A and 2B, respectively. As illustrated, a cooling module 10 of the present invention includes three-row mounting parts, in which components are mounted, including a first-row mounting part 100, a second-row mounting part 200 disposed behind the first-row mounting part, and a third-row mounting part 300 disposed behind the second-row mounting part. Here, each mounting part provides a structure in which a component may be mounted, and may refer to a body of the cooling module. Meanwhile, the body may be implemented in various structures or methods for mounting a component in the cooling module, and thus, the description of the specific structure thereof and the like will be omitted.

A component may be mounted in the first-row mounting part, another component may be mounted in the second-row mounting part, and another component may be mounted in the third-row mounting part. In the present invention, the components refer to individual elements of a cooling system, and examples of the components of the cooling system generally include a radiator, a condenser, an air-cooled intercooler, any type of heat exchanger, a cooling fan, a reservoir tank, a water pump, and a valve. In the present invention, the components of the cooling system may particularly refer to a radiator, a condenser, and a cooling fan.

As described above, the cooling module of the present invention includes the first-row to third-row mounting parts, and the radiator, the condenser and/or the cooling fan are mounted in the respective-row mounting parts. In this case, the cooling module 10 of the present invention is placed on a side of a vehicle with respect to a front-rear direction of the vehicle, with the first-row mounting part 100 being located on the outermost side.

Figure 4A:
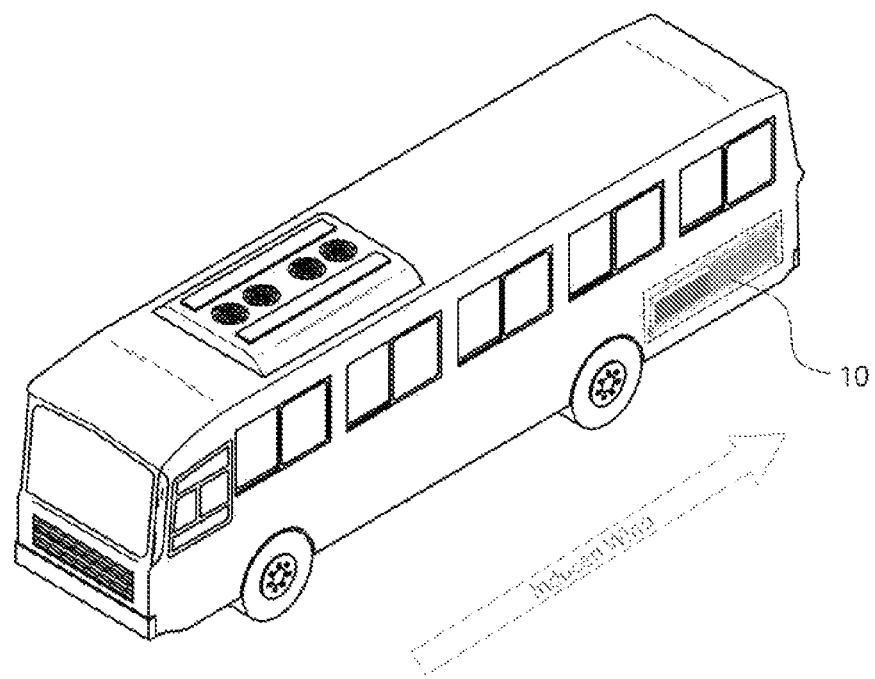
FIG. 4 is a conceptual diagram illustrating that the cooling module is placed on a side of a vehicle.
Figure 4B:
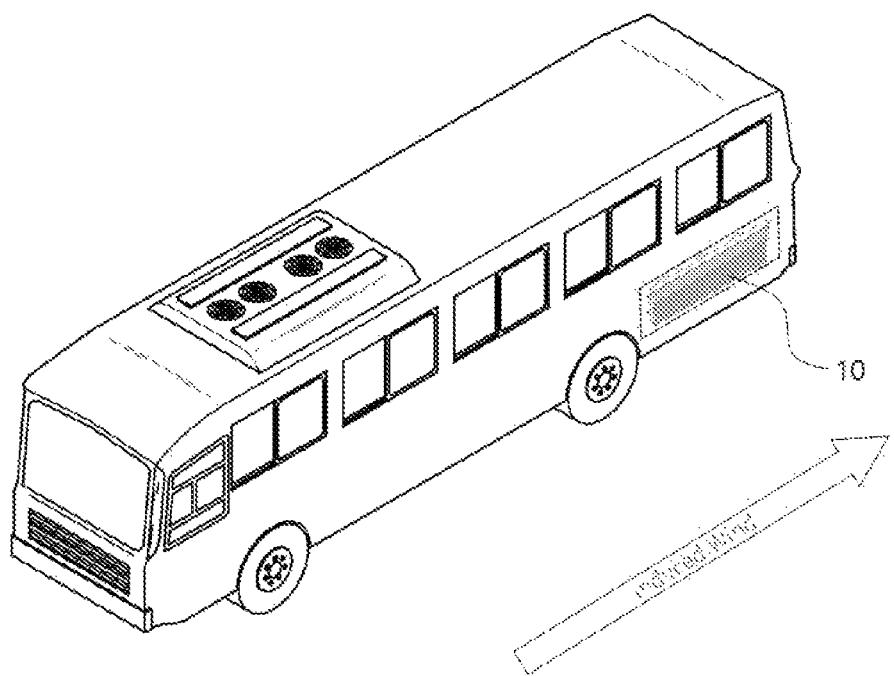

FIGS. 4A and 4B are conceptual diagrams illustrating that the cooling module is placed on the side of the vehicle. The cooling module may be additionally mounted outside a vehicle body through a separate housing or the like, but it is preferable that the cooling module is placed inside the vehicle body. That is, the cooling module of the present invention is placed on the side of the vehicle so that traveling wind generated when the vehicle travels after the driving of the vehicle is started flows in a direction perpendicular to a front side of the cooling module, and may be placed inside the vehicle body on a left side or a right side of the vehicle. The cooling module may be placed in either a front portion or a rear portion of the vehicle with respect to the front-rear direction of the vehicle, but may preferably be placed in the rear portion of the vehicle to efficiently use a space inside the vehicle. Meanwhile, the cooling module may be placed on the side of the vehicle by being fixedly coupled to the vehicle body in the vehicle through a bracket structure.

In the cooling module of the present invention, at least one of a sub-radiator and a condenser may be mounted in the first-row mounting part, a main radiator may be mounted in the second-row mounting part, and a cooling fan may be mounted in the third-row mounting part.

Figure 5:
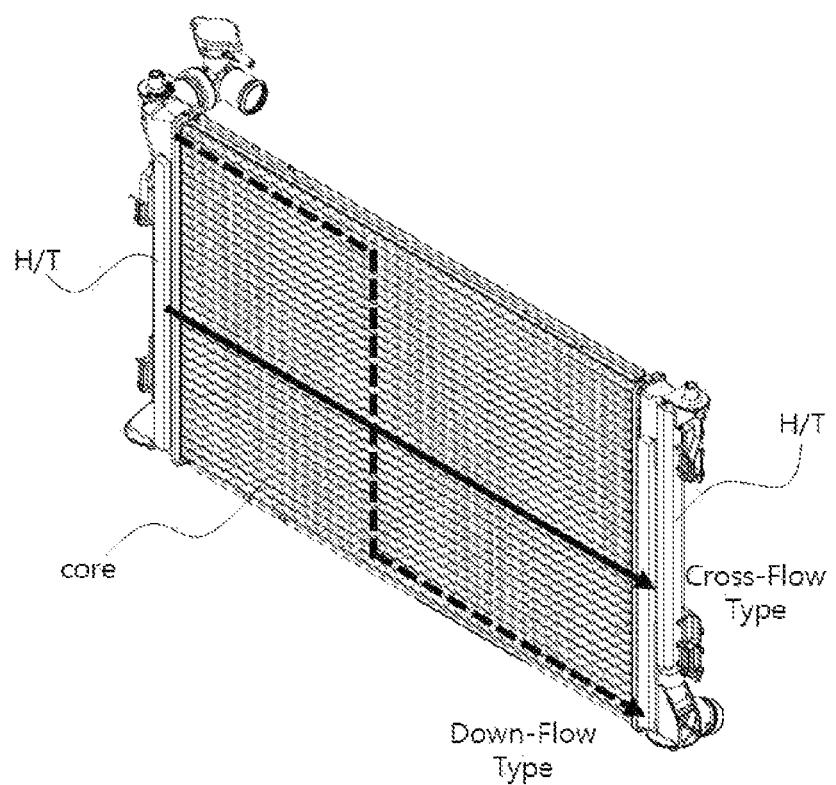
FIG. 5 illustrates a general structure of a radiator.

The radiator cools heated coolant to an appropriate temperature through heat exchange with external air. FIG. 5 illustrates a general structure of the radiator. As illustrated, the radiator is largely divided into a header tank (H/T) through which the coolant is introduced or discharged, and a core part (core), which is an area where the heat exchange occurs. The core part may include a plurality of tubes, through which the coolant flows, and fins interposed between the tubes. Meanwhile, based on a direction in which the coolant flows, the radiator is largely classified into a cross-flow type radiator, in which the coolant flows in a horizontal direction, or a down-flow type radiator, in which the coolant flows in a vertical direction.

Figure 6:
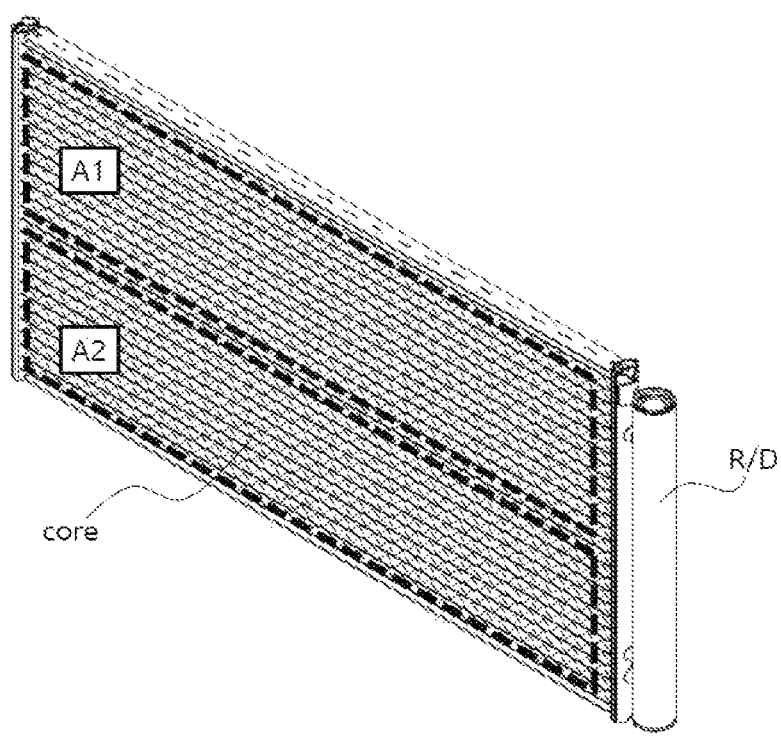
FIG. 6 illustrates a general structure of a condenser.

The condenser condenses high-temperature and high-pressure gaseous refrigerant into a liquid state by emitting heat for liquefaction through heat exchange with external air. FIG. 6 illustrates a general structure of the condenser. As illustrated, the condenser is divided into a receiver dryer tank (R/D) removing moisture from the refrigerant while storing the refrigerant, and a core part (core), which is an area where heat exchange occurs. The core part may include a plurality of tubes, through which the refrigerant flows, and fins interposed between tubes. Meanwhile, the core part may include a condensation area A1 and a sub-cool area A2. The refrigerant may be primarily condensed in the condensation area, and only liquid-state refrigerant may be separated from the primary condensed refrigerant by the receiver dryer tank and super-cooled in the sub-cool area.

Figure 7:
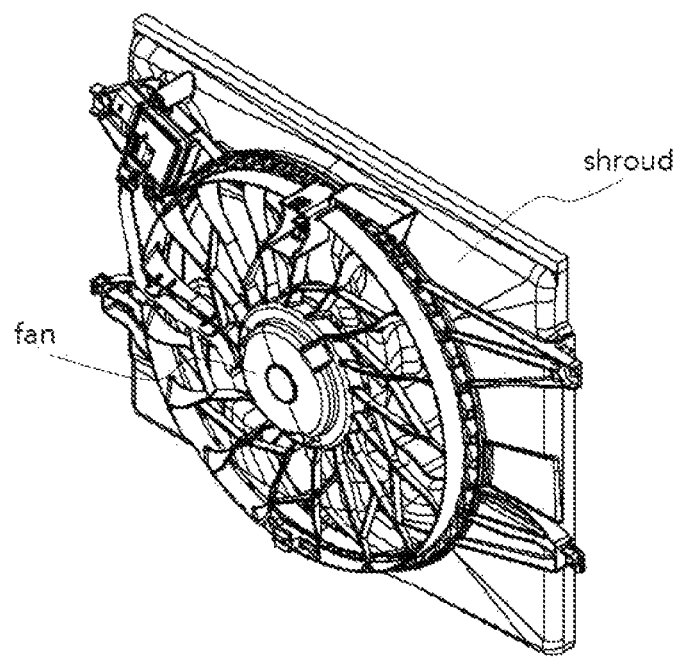
FIG. 7 illustrates a general structure of a cooling fan.

The cooling fan forcibly blows air to the heat exchanger to increase the heat dissipation efficiency of the heat exchanger such as the radiator or the condenser. FIG. 7 illustrates a general structure of the cooling fan. As illustrated, the cooling fan has a structure in which a motor fan is provided in a shroud. The cooling fan may be disposed in front of or behind the heat exchanger.

The cooling module of the present invention may be installed in a commercial vehicle (e.g., a bus, a truck, or a taxi) having a hydrogen fuel cell. In this case, the cooling module may be provided to cool a battery and an electronic component, not a stack. Here, the cooling module of the present invention may include a main radiator for cooling the electrical component and a sub-radiator for cooling the battery.

Hereinafter, the cooling module according to the first exemplary embodiment of the present invention will be described in detail.

<Cooling Module According to 1-1st Exemplary Embodiment>

Figure 8:
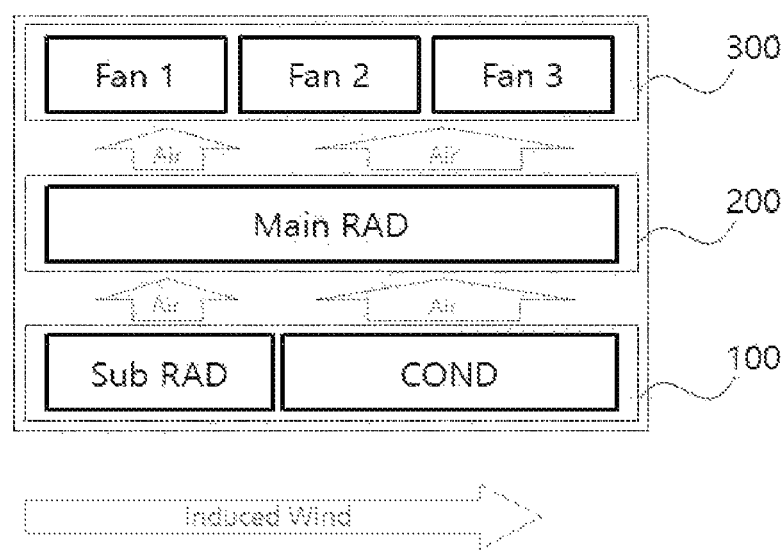
FIGS. 8 and 9 are block diagrams of a cooling module according to a 1-1st exemplary embodiment of the present invention.
Figure 9:
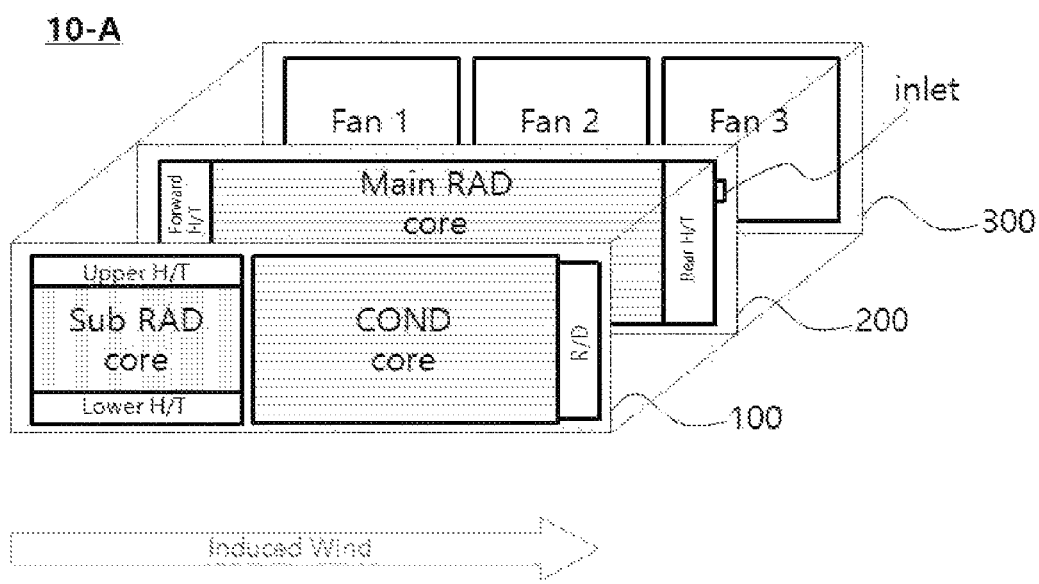

FIGS. 8 and 9 are block diagrams of a cooling module according to a 1-1st exemplary embodiment of the present invention. FIG. 8 is a block diagram of the cooling module when viewed from an upper side thereof, and FIG. 9 is a block diagram of the cooling module when viewed from a front side thereof.

In a cooling module 10-A according to the present exemplary embodiment, both a sub-radiator (Sub RAD) and a condenser (COND) may be mounted in the horizontal direction in the first-row mounting part 100, a main radiator (Main RAD) may be mounted in the second-row mounting part 200, and a cooling fan (FAN) may be mounted in the third-row mounting part 300.

First, the main radiator (Main RAD) mounted in the second-row mounting part 200 will be described. The main radiator of the present invention may be a cross-flow type radiator as described above. Specifically, a plurality of tubes may be arranged to be long in the horizontal direction, and a forward header tank (Forward H/T) and a rear header tank (Rear H/T) may be provided on both sides of the plurality of tubes, respectively, such that coolant flows in the horizontal direction. In the present invention, since the cooling module is placed on the side of the vehicle, a larger amount of external air is forcedly blown by a blowing fan to the cooling module, and more specifically, to the main radiator in a rear portion than a front portion of the main radiator with respect to the front-rear direction of the vehicle, and accordingly, heat exchange between the external air and the coolant is actively carried out in the rear portion of the main radiator. According to the present invention, even when the main radiator is formed to be long in the horizontal direction as illustrated in FIGS. 3A and 9, since the main radiator is formed in the cross-flow type, the coolant passes through all the area influenced by the blowing fan while flowing through the core part of the main radiator in the horizontal direction, thereby preventing the coolant from being biased toward one side, which causes deterioration in cooling efficiency.

Here, as illustrated in FIG. 9, the main radiator may have a coolant inlet through which the coolant is introduced into the main radiator, and the coolant inlet may be provided on one side of the rear header tank so that the coolant flows from a rear portion to a front portion of the main radiator with respect to the front-rear direction of the vehicle. In this way, since the coolant inlet is provided on one side of the rear header tank and the coolant flows in a direction from the rear portion to the front portion of the main radiator, the coolant can continuously exchange heat with counterpart cold wind, which is traveling wind, thereby increasing cooling efficiency.

Next, the sub-radiator (Sub RAD) and condenser (COND) mounted in the first-row mounting part 100 will be described. Both the sub-radiator and the condenser mounted in the first-row mounting part may be mounted in the horizontal direction, with the sub-radiator being disposed in a front portion of the first-row mounting part with respect to the front-rear direction of the vehicle, and the condenser being disposed next to the sub-radiator and in a rear portion of the first-row mounting part with respect to the front-rear direction of the vehicle. In the present invention, since the main radiator cools the electrical component, the sub-radiator cools the battery, and the condenser condenses the refrigerant as described above, coolant passing through the condenser may have a highest temperature, coolant passing through the main radiator may have a medium temperature, and coolant passing through the sub-radiator may have a lowest temperature. In other words, this means that the condenser needs to exchange heat to a greater degree than the sub-radiator.

In the present invention, since the cooling module is placed on the side of the vehicle, and the cooling fan sucks the traveling wind vertically due to its structural characteristics, a larger amount of external air is introduced into the cooling module in a rear portion than a front portion thereof. Thus, by disposing the condenser, which requires a larger heat exchange capacity, behind the sub-radiator, which requires a relatively smaller heat exchange capacity, the overall heat exchange efficiency of the cooling module can be increased.

In addition, since the refrigerant of the condenser has a higher temperature than the coolant of the sub-radiator, external air passing through the condenser has a higher temperature than external air passing through the sub-radiator. Accordingly, the external air passing through the main radiator disposed behind the sub-radiator and the condenser has a higher temperature in the rear portion than the front portion of the main radiator. Here, as described above, since the coolant flows in the main radiator from the rear portion to the front portion thereof, the coolant has a higher temperature in the rear portion than the front portion of the main radiator. This is well matched, in view of heat exchange plane, with the temperature of the external air passing through the main radiator after passing through the sub-radiator and the condenser being higher in the rear portion than the front portion of the main radiator. This arrangement structure makes it possible to maximally increase the heat exchange efficiency of the cooling module.

Meanwhile, the sub-radiator may be a down-flow type radiator. Specifically, a plurality of tubes may be arranged to be long in the vertical direction, and an upper header tank (Upper H/T) and a lower header tank (Lower H/T) may be provided on both sides of the plurality of tubes, respectively, such that coolant flows in the vertical direction. In this case, the upper header tank and the lower header tank of the sub-radiator may be disposed outside a core part area of the main radiator, so that the upper header tank and the lower header tank do not overlap the core part area of the main radiator when the cooling module is viewed from the front side thereof.

Figure 10:
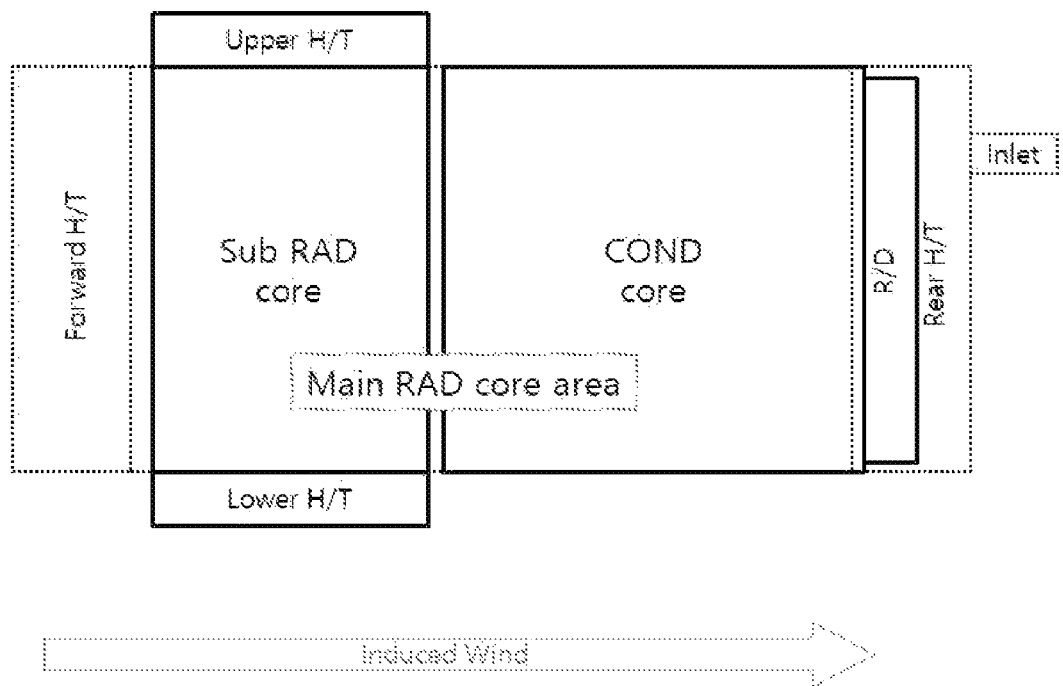
FIG. 10 is a transmission block diagram of the cooling module of FIGS. 8 and 9 when viewed from a front side thereof.

That is, FIG. 10 is a transmission block diagram of the cooling module of FIGS. 8 and 9 when viewed from the front side thereof, in which the sub-radiator and the condenser disposed on the front side are indicated by solid lines, and the main radiator disposed on the rear side is indicated by a dotted line. As illustrated, the main radiator includes header tanks provided on a forward side and a rear side thereof, respectively, in the cross-flow type, and the sub-radiator includes header tanks provided on an upper side and a lower side thereof, respectively, in the down-flow type. In this case, in order to prevent the upper header tank (Upper H/T) and the lower header tank (Lower H/T) of the sub-radiator from overlapping the core part area of the main radiator (Main RAD core area), the upper header tank may be provided outside an upper side of the core part area of the main radiator, and the lower header tank may be provided outside a lower side of the core part area of the main radiator.

This is to prevent the upper and lower header tanks of the sub-radiator from interrupting the flow of external air transferred toward the main radiator, so that the sub-radiator can be prevented from causing loss of heat exchange area in the main radiator.

The condenser (COND), which is another component mounted in the first-row mounting part 100, will be described. First, the condenser and the sub-radiator may be arranged alongside in the horizontal direction. That is, as illustrated in FIG. 9, the condenser may be disposed next to the sub-radiator, with a center line of a core part of the condenser in a height direction and a center line of a core part of the sub-radiator in the height direction being located on the same line. This is to ensure that the condenser has a maximum heat exchange area within the layout of the cooling module.

Referring back to FIG. 10, the condenser may include a receiver dryer tank (R/D) formed to be long in the vertical direction. The receiver dryer tank may be disposed outside the core part area of the main radiator and in the rear portion of the condenser with respect to the front-rear direction of the vehicle, so that the receiver dryer tank does not overlap the core part area of the main radiator when the cooling module is viewed from the front side thereof. This is to prevent loss of heat exchange area in the main radiator for the same reason why the upper and lower header tanks of the sub-radiator are disposed outside the core part area of the main radiator as described above.

Figure 11:
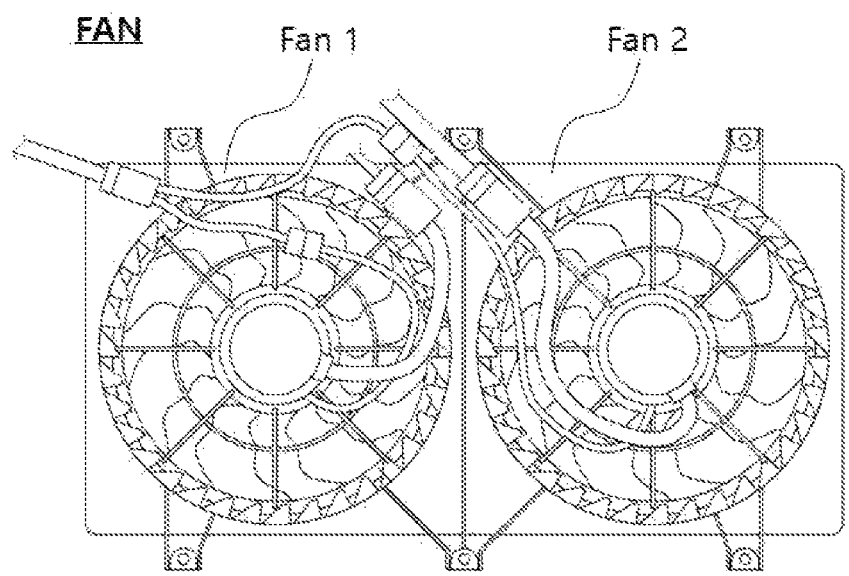
FIG. 11 is a diagram illustrating a cooling fan according to an exemplary embodiment of the present invention.

Next, the cooling fan mounted in the third-row mounting part will be described. In the present invention, the cooling fan may be formed by a plurality of unit cooling fans (Fan 1, Fan 2, . . . ) gathered together. In a general cooling module, external air is forcibly blown using one large-diameter cooling fan. In contrast, in the present invention, external air is sucked inward by using a plurality of unit cooling fans. FIG. 11 illustrates a cooling fan according to an exemplary embodiment of the present invention. As illustrated, the cooling fan may be formed by a plurality of unit cooling fans (Fan 1 and Fan 2) gathered together, and the plurality of unit cooling fans may be arranged alongside in the horizontal direction. In light of the form of the cooling module of the present invention that is long in the horizontal direction when viewed from the front side thereof, the plurality of unit cooling fans can prevent external air from being sucked in a biased manner at a certain position of the cooling module, which occurs when one cooling fan is used, and furthermore, the unit cooling fans can be provided within the layout of the cooling module, thereby increasing space utilization, and the external air can be prevented from being unnecessarily sucked outside the core part of the main radiator, thereby increasing energy efficiency. Meanwhile, although it is illustrated in FIG. 11 that the cooling fan includes two unit cooling fans, the cooling fan may include three unit cooling fans as in FIG. 3A, and the number of unit cooling fans may vary depending on the overall size of the cooling module.

<Cooling Module According to 1-2nd Exemplary Embodiment>

Figure 12:
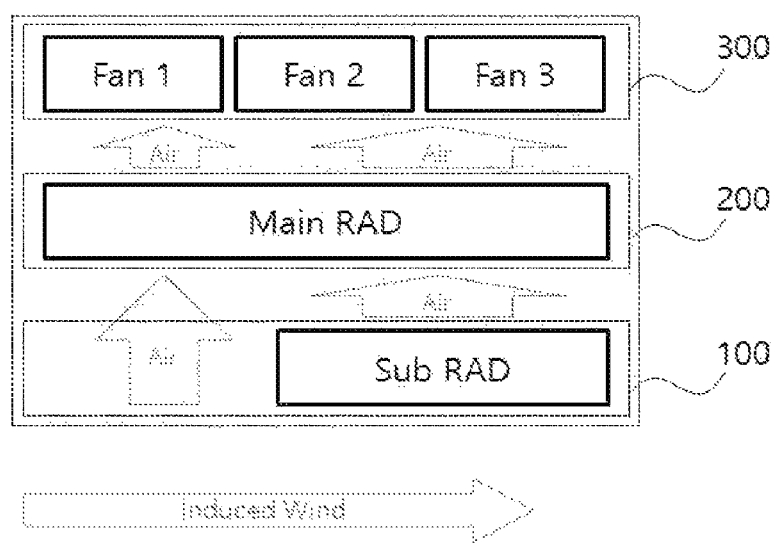
FIGS. 12 and 13 are block diagrams of a cooling module according to a 1-2nd exemplary embodiment of the present invention.
Figure 13:
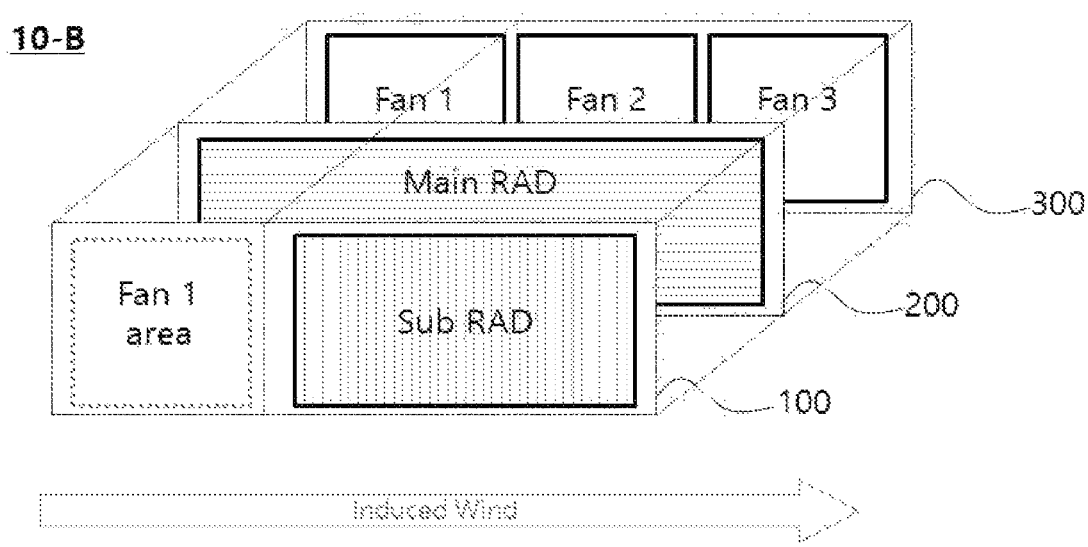

FIGS. 12 and 13 are block diagrams of a cooling module according to a 1-2nd exemplary embodiment of the present invention. FIG. 12 is a block diagram of the cooling module when viewed from an upper side thereof, and FIG. 13 is a block diagram of the cooling module when viewed from a front side thereof.

A cooling module 10-B according to the present exemplary embodiment has the same structure as the cooling module 10-A according to the 1-1st exemplary embodiment described above, but there is a difference in that only a sub-radiator is mounted in a first-row mounting part of the cooling module according to the present exemplary embodiment, whereas both the sub-radiator and the condenser are mounted in the horizontal direction in the first-row mounting part of the cooling module according to the 1-1st exemplary embodiment.

That is, in the cooling module according to the present exemplary embodiment, the sub-radiator is mounted in the first-row mounting part. In this case, a core part of the sub-radiator may have a smaller area than a core part of a main radiator, and the sub-radiator may be disposed in a rear portion of the first-row mounting part with respect to the front-rear direction of the vehicle. The reason why the sub-radiator is disposed in the rear portion of the first-row mounting part with respect to the front-rear direction of the vehicle is that a larger amount of external air is introduced in the rear portion, and accordingly, heat exchange is more actively carried out in the rear portion.

Here, the sub-radiator may be disposed not to overlap an area in which the foremost one of the plurality of unit cooling fans with respect to the front-rear direction of the vehicle is located when the cooling module is viewed from the front side thereof. Referring to FIG. 13, the sub-radiator may be disposed not to overlap an area (Fan 1 area) in which the foremost unit cooling fan (Fan 1) with respect to the front-rear direction of the vehicle is located as illustrated. This is not only to limit the size of the sub-radiator but also to dispose the sub-radiator in the rear portion of the cooling module, thereby securing both space utilization and heat exchange efficiency.

<Cooling Module According to 1-3rd Exemplary Embodiment>

Figure 14:
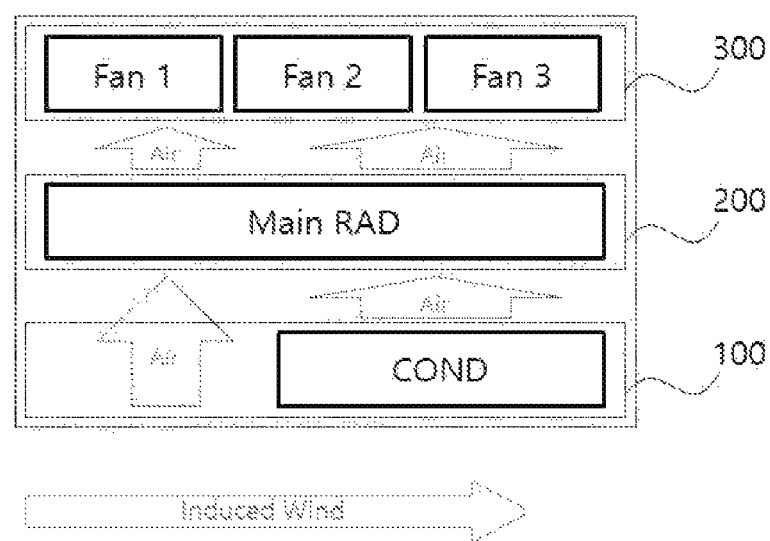
FIGS. 14 and 15 are block diagrams of a cooling module according to a 1-3rd exemplary embodiment of the present invention.
Figure 15:
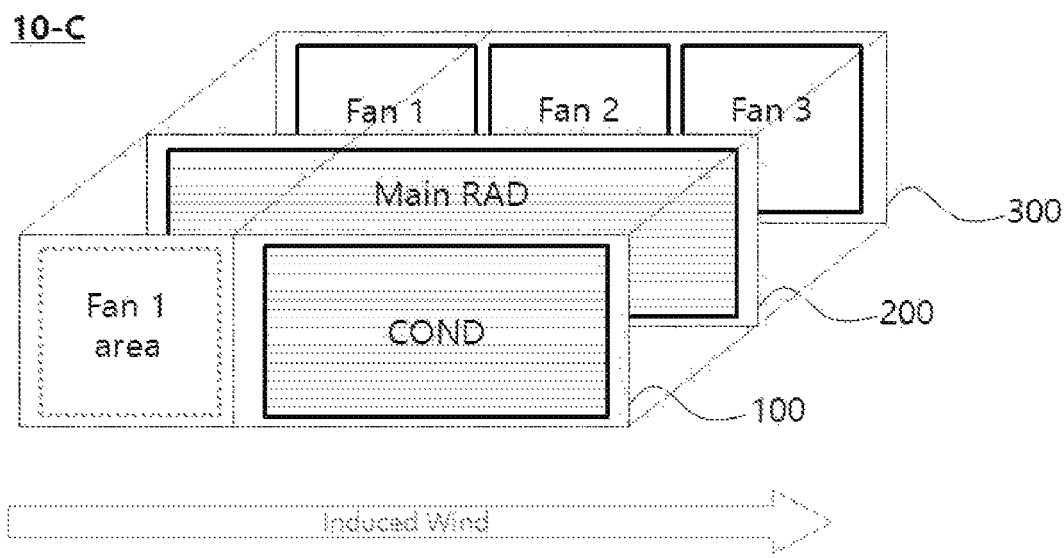

FIGS. 14 and 15 are block diagrams of a cooling module according to a 1-3rd exemplary embodiment of the present invention. FIG. 14 is a block diagram of the cooling module when viewed from an upper side thereof, and FIG. 15 is a block diagram of the cooling module when viewed from a front side thereof.

A cooling module 10-C according to the present exemplary embodiment is different from the cooling module according to the 1-2nd exemplary embodiment described above in that only a condenser is mounted in a first-row mounting part of the cooling module according to the present exemplary embodiment, whereas only the sub-radiator is mounted in the first-row mounting part of the cooling module according to the 1-2nd exemplary embodiment.

That is, in the cooling module according to the present exemplary embodiment, the condenser is mounted in the first-row mounting part. In this case, a core part of the condenser may have a smaller area than a core part of a main radiator, and the condenser may be disposed in a rear portion of the first-row mounting part with respect to the front-rear direction of the vehicle. The reason why the condenser is disposed in the rear portion of the first-row mounting part with respect to the front-rear direction of the vehicle is that a larger amount of external air is introduced in the rear portion, and accordingly, heat exchange is more actively carried out in the rear portion.

Here, the condenser may be disposed not to overlap an area in which the foremost one of the plurality of unit cooling fans with respect to the front-rear direction of the vehicle is located when the cooling module is viewed from the front side thereof. Referring to FIG. 15, the condenser may be disposed not to overlap an area (Fan 1 area) in which the foremost unit cooling fan (Fan 1) with respect to the front-rear direction of the vehicle is located as illustrated. This is not only to limit the size of the condenser but also to dispose the condenser in the rear portion of the cooling module, thereby securing both space utilization and heat exchange efficiency.

Hereinafter, the cooling module according to the second exemplary embodiment of the present invention will be described in detail.

<Cooling Module According to Second Exemplary Embodiment>

Figure 16:
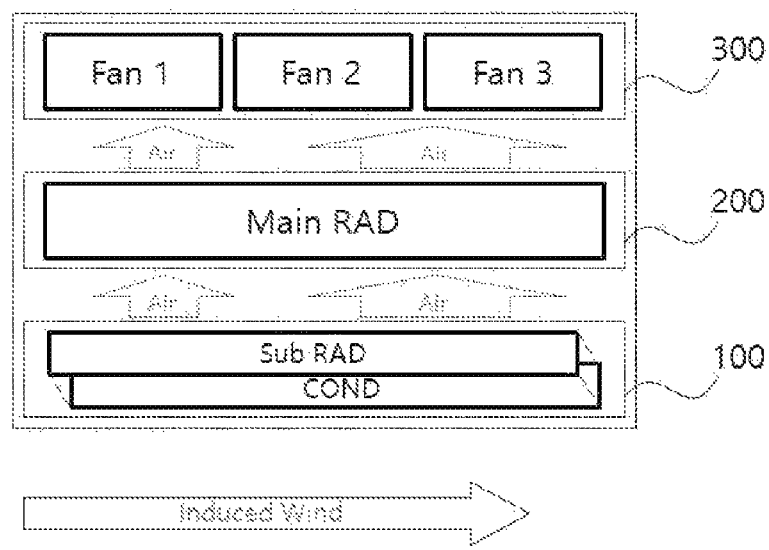
FIGS. 16 and 17 are block diagrams of a cooling module according to a second exemplary embodiment of the present invention.
Figure 17:
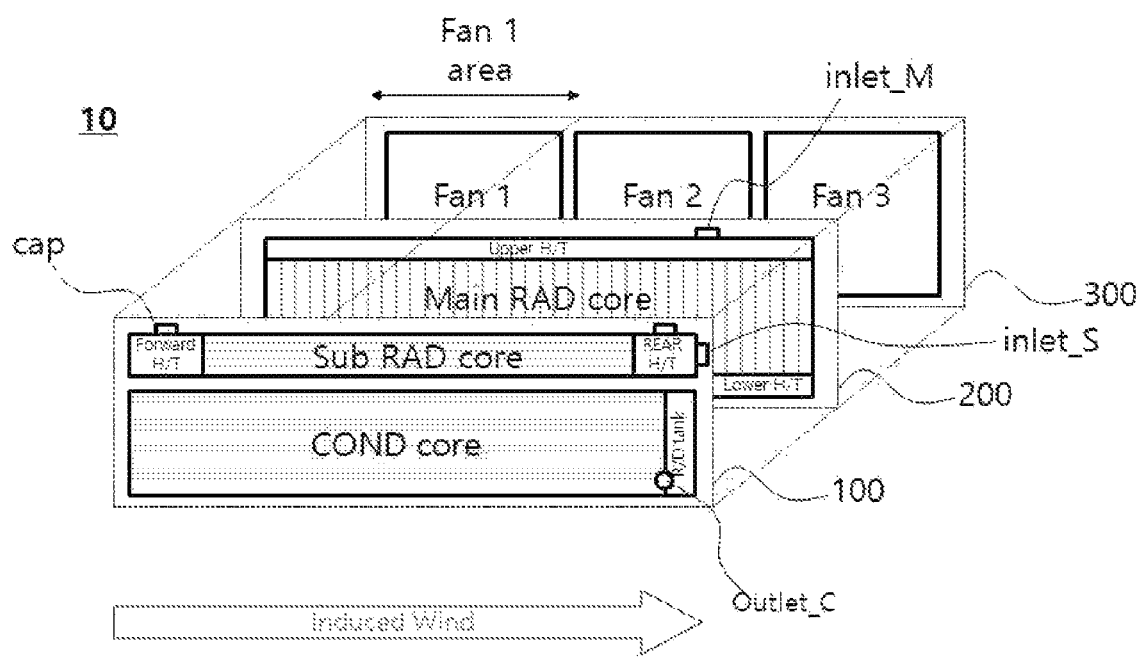

FIGS. 16 and 17 are block diagrams of a cooling module according to a second exemplary embodiment of the present invention. FIG. 16 is a block diagram of the cooling module when viewed from an upper side thereof, and FIG. 17 is a block diagram of the cooling module when viewed from a front side thereof.

In a cooling module 10 according to the present exemplary embodiment, both a sub-radiator (Sub RAD) and a condenser (COND) may be mounted in the vertical direction in a first-row mounting part 100, a main radiator (Main RAD) may be mounted in a second-row mounting part 200, and a cooling fan (FAN) may be mounted in a third-row mounting part 300.

First, the cooling fan (FAN) mounted in the third-row mounting part 300 will be described. In the present invention, the cooling fan may be formed by a plurality of unit cooling fans (Fan 1, Fan 2, . . . ) gathered together. In a general cooling module, external air is forcibly blown using one large-diameter cooling fan. In contrast, in the present invention, external air is sucked inward by using a plurality of unit cooling fans. Referring back to FIG. 11, as illustrated, the cooling fan may be formed by a plurality of unit cooling fans (Fan 1 and Fan 2) gathered together, and the plurality of unit cooling fans are arranged alongside in the horizontal direction. In light of the form of the cooling module of the present invention that is long in the horizontal direction when viewed from the front side thereof, the plurality of unit cooling fans can prevent external air from being sucked in a biased manner at a certain position of the cooling module, which occurs when one cooling fan is used, and furthermore, the unit cooling fans can be provided within the layout of the cooling module, thereby increasing space utilization, and the external air can be prevented from being unnecessarily sucked outside a core part of the main radiator, thereby increasing energy efficiency. Meanwhile, although it is illustrated in FIG. 11 that the cooling fan includes two unit cooling fans, the cooling fan may include three unit cooling fans as in FIG. 3B, and the number of unit cooling fans may vary depending on the overall size of the cooling module.

Next, the main radiator (Main RAD) mounted in the second-row mounting part 200 will be described. The main radiator may be a down-flow type radiator as described above. Specifically, a plurality of tubes may be arranged to be long in the vertical direction, and an upper header tank (Upper H/T) and a lower header tank (Lower H/T) may be provided on both sides of the plurality of tubes, respectively, such that coolant flows in the vertical direction.

Here, as illustrated in FIG. 17, the main radiator may have a coolant inlet (inlet_M) through which the coolant is introduced into the main radiator. The coolant inlet may be provided on one side of the upper header tank so that the coolant flows from an upper portion to a lower portion of the main radiator with respect to the front-rear direction of the vehicle, and may be disposed at the rear portion of the main radiator with respect to the front-rear direction of the vehicle so that the coolant inlet does not overlap an area (Fan 1 area) in which the foremost one (Fan 1) of the plurality of unit cooling fans with respect to the front-rear direction of the vehicle is located when the cooling module is viewed from the front side thereof.

In the present invention, the cooling module is placed on the side of the vehicle. A larger amount of external air is forcedly blown by a blowing fan to the cooling module, and more specifically, to the main radiator in a rear portion than a front portion of the main radiator with respect to the front-rear direction of the vehicle, and accordingly, heat exchange between the external air and the coolant is actively carried out in the rear portion of the main radiator. In this case, by disposing the coolant inlet at a rear portion of the vehicle, and more specifically, at the rear portion that does not overlap the foremost unit cooling fan, as in the present invention, the flow of the coolant increases in the rear portion of the main radiator, thereby securing maximum heat exchange performance between the external air and the coolant.

Next, the sub-radiator (Sub RAD) and condenser (COND) mounted in the first-row mounting part 100 will be described. As illustrated in FIG. 17, both the sub-radiator and the condenser may be mounted in the vertical direction in the first-row mounting part, with the sub-radiator being disposed in an upper portion of the first-row mounting part with respect to the front-rear direction of the vehicle, and the condenser being disposed below the sub-radiator and in a lower portion of the first-row mounting part with respect to the front-rear direction of the vehicle.

Here, the sub-radiator may be a cross-flow type radiator. Specifically, a plurality of tubes may be arranged to be long in the horizontal direction, and a forward header tank (Forward H/T) and a rear header tank (Rear H/T) may be provided on both sides of the plurality of tubes, respectively, such that coolant may flow in the horizontal direction.

In this case, the sub-radiator may have a coolant inlet (inlet_S) through which the coolant is introduced into the sub-radiator, and the coolant inlet may be provided on one side of the rear header tank so that the coolant flows from a rear portion to a front portion of the sub-radiator with respect to the front-rear direction of the vehicle. In the cooling module of the present invention, since a larger amount of external air is introduced into the cooling module in a rear portion than a front portion thereof as described above, the coolant inlet, through which high-temperature coolant is introduced, is provided on one side of the rear header tank located in a rear portion of the sub-radiator with respect to the front-rear direction of the vehicle to increase efficiency in heat exchange with external air.

Furthermore, the forward header tank and the rear header tank of the sub-radiator may be disposed outside a core part area of the main radiator so that the forward header tank and the rear header tank do not overlap the core part area of the main radiator when the cooling module is viewed from the front side thereof.

Figure 18:
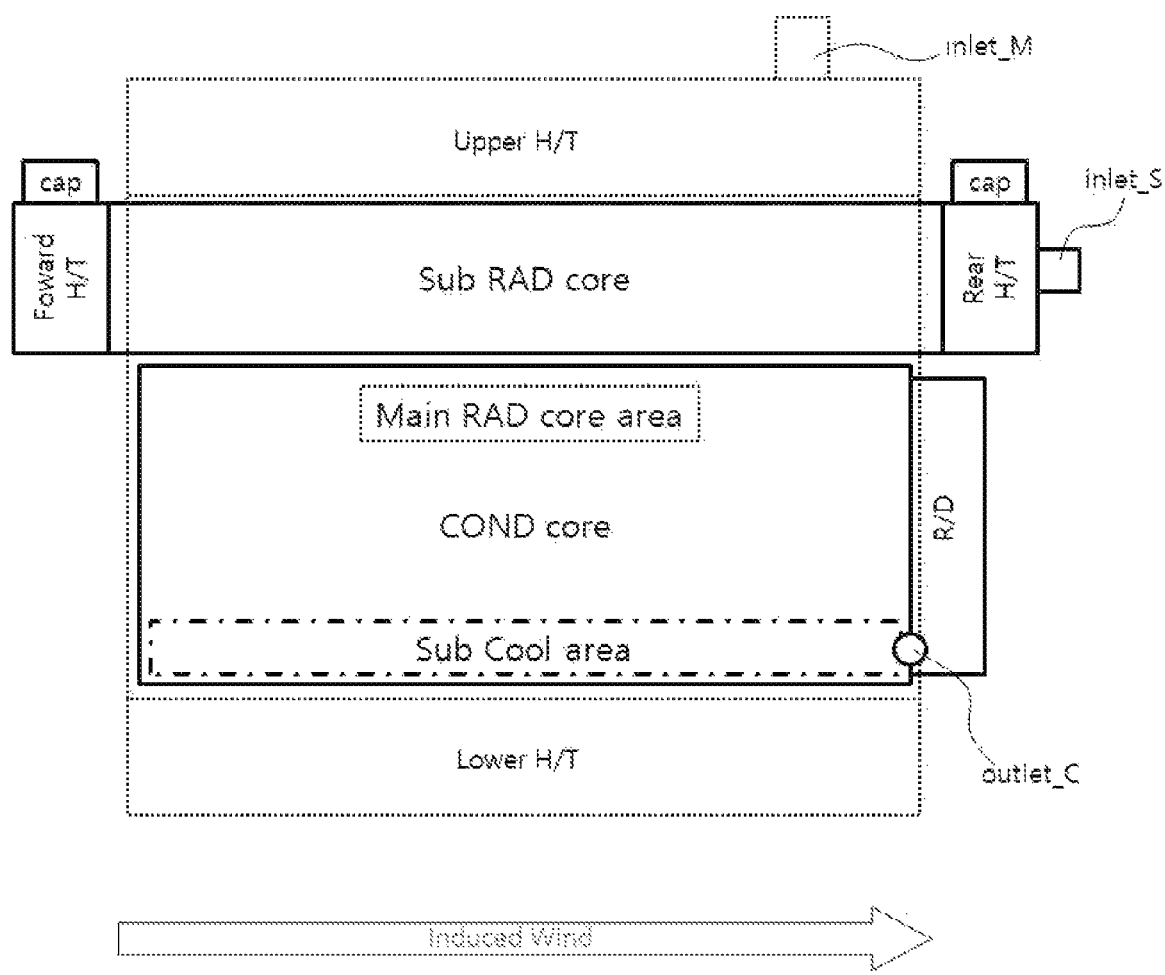
FIG. 18 is a transmission block diagram of the cooling module of FIGS. 16 and 17 when viewed from a front side thereof.

That is, FIG. 18 is a transmission block diagram of the cooling module of FIGS. 16 and 17 when viewed from the front side thereof, in which the sub-radiator and the condenser disposed on the front side are indicated by solid lines, and the main radiator disposed on the rear side is indicated by a dotted line. As illustrated, the main radiator includes header tanks provided on an upper side and a lower side thereof, respectively, in the down-flow type, and the sub-radiator includes header tanks provided on a forward side and a rear side thereof, respectively, in the cross-flow type. In this case, in order to prevent the forward header tank (Forward H/T) and the rear header tank (Rear H/T) of the sub-radiator from overlapping the core part area of the main radiator (Main RAD core area), the forward header tank may be provided outside a forward side of the core part area of the main radiator, and the rear header tank may be provided outside a rear side of the core part area of the main radiator. This is to prevent the forward and rear header tanks of the sub-radiator from interrupting the flow of external air transferred toward the main radiator, so that the sub-radiator can be prevented from causing loss of heat exchange area in the main radiator.

Furthermore, as illustrated in FIG. 18, the sub-radiator further includes a pressure cap (cap) capable of regulating a pressure inside the sub-radiator. The pressure cap (cap) may be provided on an upper side of at least one of the forward header tank (Forward H/T) and the rear header tank (Rear H/T), and integrally formed with the forward header tank and/or the rear header tank. That is, when only one pressure cap is provided, the pressure cap may be provided on the upper side of the forward header tank or the rear header tank and integrally formed with the forward header tank or the rear header tank, and when pressure caps are provided on the upper side of the forward header tank and on the upper side of the rear header tank, respectively, the pressure caps may be integrally formed with the forward header tank and the rear header tank, respectively.

In general, it is preferable that the pressure cap is disposed in an upper portion of the cooling module so that a user may easily perform work outside through the pressure cap. At this point, in the present invention, since the sub-radiator is disposed in the upper portion of the cooling module, the pressure cap can be integrally provided on the upper side of the header tank of the sub-radiator, thereby providing a convenient work environment for the user, and furthermore, it is possible to omit a connection structure through a separate pipe or the like for disposing the pressure cap in the upper portion of the cooling module, thereby using a space inside the cooling module in a denser manner.

Figure 19:
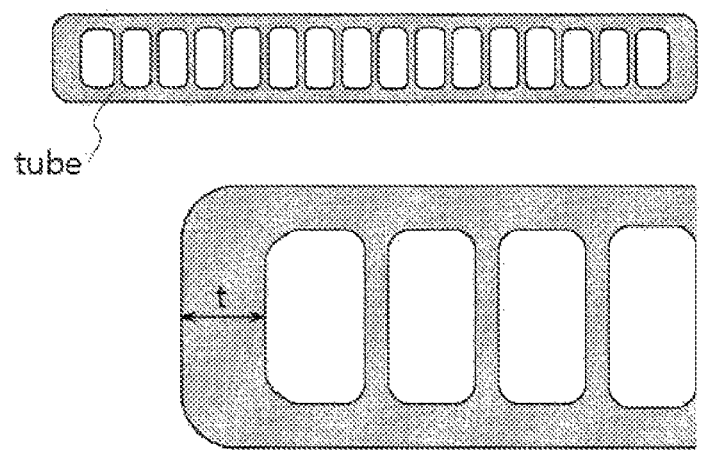
FIG. 19 is a cross-sectional view of a tube of a heat exchanger.

The condenser (COND), which is another component mounted in the first-row mounting part 100, will be described. First, the condenser and the sub-radiator may be arranged alongside in the vertical direction. That is, as illustrated in FIG. 19, the condenser may be disposed below the sub-radiator, with a center line of a core part of the condenser in a height direction and a center line of a core part of the sub-radiator in the height direction being located on the same line. This is to ensure that the condenser has a maximum heat exchange area within the layout of the cooling module.

Here, as indicated by a chain line in FIG. 18, the condenser may have a sub-cool area (Sub Cool area) formed in a lower portion of the core part of the condenser. To this end, the condenser may have a refrigerant outlet (outlet_C), through which the refrigerant is discharged from the condenser, at a lower portion of the condenser and on a rear side of the condenser with respect to the front-rear direction of the vehicle. The refrigerant outlet may be formed in communication with a receiver dryer tank (R/D) of the condenser.

The sub-cool area has a lower temperature than the other area in the condenser, and accordingly, external air passing through the sub-cool area has a relatively low temperature. In this case, since the main radiator is in the down-flow type as described above, the coolant flowing through the main radiator also has a temperature that gradually decreases from the upper portion to the lower portion of the main radiator. This is well matched with the relatively low temperature of the external air after passing through the sub-cool area of the condenser, thereby improving the heat exchange efficiency of the cooling module. Furthermore, since the refrigerant outlet of the condenser is provided on the rear side of the condenser, the core part of the condenser may have a lower temperature in a rear portion than a front portion thereof. In the present invention, since the cooling module is placed on the side of the vehicle, and the cooling fan sucks the traveling wind vertically due to its structural characteristics, a larger amount of external air is introduced into the cooling module in the rear portion than the front portion thereof. In light thereof, the refrigerant outlet is provided on the rear side of the condenser such that the external air and the refrigerant of the condenser are well matched in terms of heat exchange area, thereby further improving the heat exchange efficiency of the cooling module.

In addition, in the present invention, the tubes of the condenser may have a larger thickness than the tubes of the sub-radiator. FIG. 19 illustrates a cross-section of the tube of the heat exchanger. The thickness of the tubes in the heat exchangers, that is, the radiators and the condenser in the present invention, may refer to a thickness (t) of an outer side portion based on the cross-section of the tube as illustrated. Since the condenser is disposed below of the sub-radiator, the condenser may be more vulnerable to damage due to stone splashing or the like than the sub-radiator. By forming the tubes of the condenser to be thick as a countermeasure, it is possible to prevent damage to the condenser, that is, the cooling module.

As described so far, the cooling module according to the present invention is placed on the side of the vehicle, and is nevertheless capable of not only maximizing cooling efficiency but also maximizing space utilization within the layout of the cooling module.

Although the exemplary embodiments of the present invention have been described above with reference to accompanying drawings, those skilled in the art to which the present invention pertains may appreciate that the present invention may be implemented in another specific form without changing the technical spirit or the essential feature of the present invention. Therefore, it should be understood that the exemplary embodiments described above are illustrative and not restrictive in all respects.

What is claimed is:

1. A cooling module comprising:
   a first-row mounting part in which a component is mounted;
   a second-row mounting part in which another component is mounted, the second-row mounting part being disposed behind the first-row mounting part; and
   a third-row mounting part in which another component is mounted, the third-row mounting part being disposed behind the second-row mounting part,
   wherein the cooling module is placed on a side of a vehicle with respect to a front-rear direction of the vehicle, with the first-row mounting part being located on an outermost side;
   wherein at least one of a sub-radiator and a condenser is mounted in the first-row mounting part,
   a main radiator is mounted in the second-row mounting part,
   a cooling fan is mounted in the third-row mounting part, and
   the main radiator is a cross-flow type radiator including a plurality of tubes arranged to be long in a horizontal direction, and a forward header tank and a rear header tank provided on both sides of the plurality of tubes, respectively, such that coolant flows in the horizontal direction;

wherein the cooling fan is formed by a plurality of unit cooling fans gathered together, and the plurality of unit cooling fans are arranged alongside in the horizontal direction; and wherein the sub-radiator is mounted in the first-row mounting part, a core part of the sub-radiator has a smaller area than a core part of the main radiator, the sub-radiator is disposed in a rear portion of the first-row mounting part with respect to the front-rear direction of the vehicle, and the sub-radiator is disposed not to overlap an area in which a foremost one of the plurality of unit cooling fans with respect to the front-rear direction of the vehicle is located when the cooling module is viewed from a front side thereof.

2. A cooling module comprising:

a first-row mounting part in which a component is mounted;

a second-row mounting part in which another component is mounted, the second-row mounting part being disposed behind the first-row mounting part; and a third-row mounting part in which another component is mounted, the third-row mounting part being disposed behind the second-row mounting part, wherein the cooling module is placed on a side of a vehicle with respect to a front-rear direction of the vehicle, with the first-row mounting part being located on an outermost side;

wherein at least one of a sub-radiator and a condenser is mounted in the first-row mounting part, a main radiator is mounted in the second-row mounting part, a cooling fan is mounted in the third-row mounting part, and the main radiator is a cross-flow type radiator including a plurality of tubes arranged to be long in a horizontal direction, and a forward header tank and a rear header tank provided on both sides of the plurality of tubes, respectively, such that coolant flows in the horizontal direction;

wherein the cooling fan is formed by a plurality of unit cooling fans gathered together, and the plurality of unit cooling fans are arranged alongside in the horizontal direction; and wherein the condenser is mounted in the first-row mounting part, a core part of the condenser has a smaller area than a core part of the main radiator, the condenser is disposed in a rear portion of the first-row mounting part with respect to the front-rear direction of the vehicle, and the condenser is disposed not to overlap an area in which a foremost one of the plurality of unit cooling fans with respect to the front-rear direction of the vehicle is located when the cooling module is viewed from a front side thereof.

3. The cooling module of claim 2, wherein the main radiator has a coolant inlet through which the coolant is introduced into the main radiator, and the coolant inlet is provided on one side of the rear header tank so that the coolant flows from a rear portion to a front portion of the main radiator with respect to the front-rear direction of the vehicle.

4. The cooling module of claim 2, wherein both the sub-radiator and the condenser are mounted in the horizontal direction in the first-row mounting part, the sub-radiator is disposed in a front portion of the first-row mounting part with respect to the front-rear direction of the vehicle, the condenser is disposed next to the sub-radiator and in a rear portion of the first-row mounting part with respect to the front-rear direction of the vehicle, and the sub-radiator is a down-flow type radiator including a plurality of tubes arranged to be long in a vertical direction, and an upper header tank and a lower header tank provided on both sides of the plurality of tubes, respectively, such that the coolant flows in the vertical direction.

5. The cooling module of claim 4, wherein the upper header tank and the lower header tank of the sub-radiator are disposed outside a core part area of the main radiator, so that the upper header tank and the lower header tank do not overlap the core part area of the main radiator when the cooling module is viewed from a front side thereof.

6. The cooling module of claim 4, wherein the condenser includes a receiver dryer tank formed to be long in the vertical direction, and the receiver dryer tank is disposed outside a core part area of the main radiator and in the rear portion of the first-row mounting part with respect to the front-rear direction of the vehicle, so that the receiver dryer tank does not overlap the core part area of the main radiator when the cooling module is viewed from a front side thereof.

7. The cooling module of claim 2, wherein the vehicle is a hydrogen commercial vehicle, the main radiator cools coolant for cooling an electrical component of the hydrogen commercial vehicle, and the sub-radiator cools coolant for cooling a battery of the hydrogen commercial vehicle.

8. A cooling module comprising:

a first-row mounting part in which a component is mounted;

a second-row mounting part in which another component is mounted, the second-row mounting part being disposed behind the first-row mounting part; and a third-row mounting part in which another component is mounted, the third-row mounting part being disposed behind the second-row mounting part, wherein the cooling module is placed on a side of a vehicle with respect to a front-rear direction of the vehicle, with the first-row mounting part being located on an outermost side;

wherein at least one of a sub-radiator and a condenser is mounted in the first-row mounting part, a main radiator is mounted in the second-row mounting part, a cooling fan is mounted in the third-row mounting part, and the main radiator is a down-flow type radiator including a plurality of tubes arranged to be long in a vertical direction, and an upper header tank and a lower header tank provided on both sides of the plurality of tubes, respectively, such that coolant flows in the vertical direction;

wherein the cooling fan is formed by a plurality of unit cooling fans gathered together, and the plurality of unit cooling fans are arranged alongside in the horizontal direction; and wherein the main radiator has a coolant inlet through which the coolant is introduced into the main radiator, and wherein the coolant inlet is provided on one side of the upper header tank and disposed in a rear portion of the main radiator with respect to the front-rear direction of the vehicle not to overlap an area in which a foremost one of the plurality of unit cooling fans with respect to the front-rear direction of the vehicle is located when the cooling module is viewed from a front side thereof.

9. The cooling module of claim 8, wherein both the sub-radiator and the condenser are mounted in the vertical direction in the first-row mounting part,
the sub-radiator is disposed in an upper portion of the first-row mounting part,
the condenser is disposed below the sub-radiator, and
the sub-radiator is a cross-flow type radiator including a plurality of tubes arranged to be long in a horizontal direction, and a forward header tank and a rear header tank provided on both sides of the plurality of tubes, respectively, such that the coolant flows in the horizontal direction.

10. The cooling module of claim 9, wherein the sub-radiator has a coolant inlet through which the coolant is introduced into the sub-radiator, and
the coolant inlet is provided in the rear header tank so that the coolant flows from a rear portion to a front portion of the sub-radiator with respect to the front-rear direction of the vehicle.

11. The cooling module of claim 9, wherein the forward header tank and the rear header tank of the sub-radiator are disposed outside a core part area of the main radiator, so that the forward header tank and the rear header tank do not overlap the core part area of the main radiator when the cooling module is viewed from a front side thereof.

12. The cooling module of claim 9, wherein the sub-radiator further includes a pressure cap regulating a pressure inside the sub-radiator, and
the pressure cap is provided on an upper side of at least one of the forward header tank and the rear header tank, and integrally formed with the forward header tank and/or the rear header tank.

13. The cooling module of claim 9, wherein the condenser has a sub-cool area formed in a lower portion of a core part of the condenser.

14. The cooling module of claim 9, wherein the tubes of the condenser have a larger thickness than the tubes of the sub-radiator.

15. The cooling module of claim 8, wherein the vehicle is a hydrogen commercial vehicle,
the main radiator cools coolant for cooling an electrical component of the hydrogen commercial vehicle, and
the sub-radiator cools coolant for cooling a battery of the hydrogen commercial vehicle.

* * * * *